May 10, 1960

F. A. DOMBROWSKI ET AL
PROCESS FOR MARKING THERMOPLASTIC
SURFACES AND RESULTANT PRODUCT
Filed Dec. 16, 1957

2,936,209

INVENTORS
FRANK A. DOMBROWSKI
WILLIAM T. MacLEISH
BY Bessie A. Lepper
ATTORNEY

United States Patent Office 2,936,209
Patented May 10, 1960

2,936,209

PROCESS FOR MARKING THERMOPLASTIC SURFACES AND RESULTANT PRODUCT

Frank A. Dombrowski, Rochester, N.Y., and William T. MacLeish, Somerville, Mass., assignors, by direct and mesne assignments, to Optical Gaging Products, Inc., Rochester, N.Y., a corporation of New York Application December 16, 1957, Serial No. 702,880

16 Claims. (Cl. 8—4)

This invention relates to a method for inscribing permanent indicia on plastic surfaces and to products formed thereby.

Many processes for marking glass or metal surfaces are known, such as etching and metal coating done in vacuo, but these processes are not applicable to permanently marking plastic surfaces. Moreover, many of these processes require operational steps which are either complicated, restricted to a narrow time cycle, inconvenient to perform or demand a high degree of control over the conditions used. For example, these steps may include the use of corrosive materials such as hydrofluoric acid for etching, complicated apparatus for vacuum deposition of metals, or exposure and development of photographic plates in a photographic process. In addition, many of the techniques now known are incapable of achieving sharp lines and good definitions such as may be required in optical gauges for example.

It would therefore be desirable to have a method for marking plastic surfaces with permanent indicia which would not require strong acids, the use of complicated techniques and apparatus, or the necessity of working under difficult conditions such as are required in the use of photographic techniques. Further it would be desirable to have a process for impressing indicia on plastic surfaces, which process is simple to operate to give clear and well-defined marks.

It is therefore an object of this invention to provide a method of placing permanent indicia on a plastic surface by a simple technique which does not require the complicated steps noted above or the use of corrosive materials or of vacuum techniques.

Another object is to provide a coating or resist system which can be put on a plastic surface and which is undisturbed by pressures or displacement forces below a predetermined amount so that when pressures or displacement forces greater than the predetermined amount are applied, the resist system is displaced or incised and the plastic surface is exposed. The exposed portions may then be permanently stained or dyed to give clear cut, well-defined indicia. By supplying the proper resist system with the desired scribing characteristics, it is possible to make lines which are so accurate and well-defined that the resulting marked plastic surface may be used as an optical gauge. It is therefore another object of this invention to provide a method for making very accurate indicia on a plastic surface by a simple process, and to provide a coated plastic surface which even a semi-skilled artisan can convert into an accurately marked surface.

It is another object to provide a plastic surface which is coated with a resist system which has good scribing qualities, which will remain unaffected by solvents used to apply dyes or stains, and which can subsequently be easily removed from the plastic surface. Still another object is to provide a plastic surface such as an optical gauge which is permanently marked by well-defined indicia.

These and other objects will become apparent in the following description.

Thermoplastic surfaces are marked by the process of this invention by applying a resist system to the plastic surface to be marked, impressing or incising the desired indicia on the resist system so that where the pressure has been applied the resist is removed to expose the plastic surface, applying one or more stains or dyes to the resist system surface in such a way that the stain or dye will contact the exposed plastic surface to permanently dye or mark the plastic, and finally removing the resist system to leave the permanently inscribed indicia on the plastic surface.

Inasmuch as staining or dyeing of a plastic surface must be accomplished by an actual solvation of or reaction with the plastic, it is necessary to carry the dye or stain in a liquid medium which is at least a partial solvent for or a reactant with the plastic. This liquid medium cannot, however, be a solvent for or a reactant with at least the upper layer of the resist system. It is therefore necessary that the resist system be matched with the plastic to be marked so that the liquid medium carrying the ink in the form of a stain or dye is a solvent for the plastic but a non-solvent for at least the upper portion of the resist system.

In addition to this chemical property the resist system must have good scribing properties and is conveniently one which may be easily removed by a process which will not adversely affect the plastic surface or the indicia impressed thereon. Inasmuch as some resists possess good scribing qualities but do not meet the chemical properties required, the resist system may be made up of multiple coatings, the upper one of which should be essentially insoluble in the liquid medium used to carry the dye or stain.

By employing the proper resist system for a given plastic surface, it is possible by this invention to mark the plastic surface to impress thereon indicia which meet all of the desired qualities, i.e., good definition, clear lines without feathering, and no undue thickening where lines cross. This invention will now be explained in detail with reference to the accompanying drawings in which Fig. 1 is an enlarged cross-sectional representation of a thermoplastic base material coated with a resist system and suitable for marking in accordance with this invention;

This invention may be described first in general terms with reference to Figs. 1 through 5. In these figures like numbers represent like elements.

Figure 1:
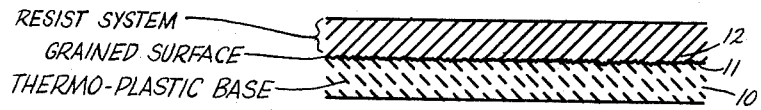
Figure 2:
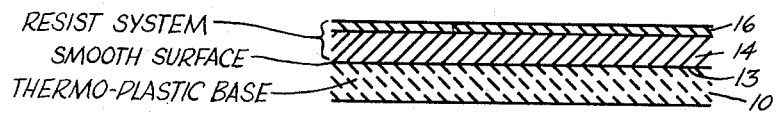
Fig. 2 is an enlarged cross-sectional representation of a modification of the resist system of Fig. 1.
Figure 3:
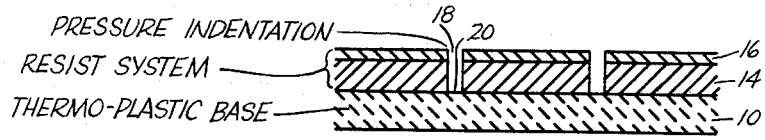
Fig. 3 illustrates the coated thermoplastic base of Fig. 2 after the indicia have been impressed upon or incised in the resist system.
Figure 4:
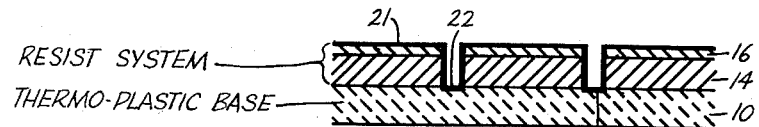
Fig. 4 shows the arrangement in Fig. 3 after stain has been applied.
Figure 5:
Fig. 5 represents the stained thermoplastic surface after removal of the resist system.

In Fig. 1 a thermoplastic base 10 is coated on its surface (in this case a grained surface 11) with a resist system 12 consisting of a single coat of resist material. In Fig. 2 the plastic base is represented as having a smooth surface 13 on which is coated a resist system made up of a first or bottom resist 14 and a second or top resist 16. In Fig. 3 the resist system has had a force applied to it in certain areas to make indentations or incisions 18 which expose the plastic surface 20. After a suitable dye or stain, contained in a liquid carrier, is applied to the resist surface, the dye or stain 21 is retained on the resist surface at all points except where the plastic surface has been exposed. At these points 22 the dye or stain is permitted to partially dissolve or react with the plastic surface to permanently mark the surface as illustrated in Fig. 4. Subsequent to staining, the resist system is removed to leave the marked plastic of Fig. 5.

The plastics suitable for marking in accordance with the process of this invention may be defined as those thermoplastic materials for which there exists suitable solvents or reactants which serve as the liquid medium to carry the dyes or stain. Among the thermoplastic materials which may be so permanently marked are the vinyl polymers, such as polyvinyl chloride, polyvinyl acetate, and polyvinyl alcohol, and their copolymers with or without additional components such as maleic anhydride; vinylidene chloride and its copolymers with other materials; and the vinyl butyrals and formals. Also included are the cellulose plastics such as the cellulose esters and ethers (for example, cellulose acetate, cellulose nitrate, and cellulose acetate butyrate) and ethyl cellulose. Other thermoplastic materials suitable for the practice of this invention include, but are not limited to, polystyrene; the methacrylates, such as methyl methacrylate; and the alcohol-soluble nylons.

The thermoplastic material chosen will depend upon the characteristics desired of the surface to be marked. For example, in making optical gauges it is desirable to have a plastic surface which exhibits good dimensional stability. Other characteristics which may be desired would include flexibility or rigidity, structural strength, and the like.

The plastic surface to be marked may be either smooth or grained, i.e., a surface similar to ground glass. It is desirable to use a grained surface for applications such as optical gauges and where it is desirable to have a diffuse background.

The resist system, such as illustrated by the single coating 12 of Fig. 1 or the dual coating 14 and 16 of Fig. 2 must be essentially unaffected by the liquid medium used as the stain or dye carrier. In the case of the resist system made of two separate coatings, only the upper or second coating need be so resistant to this liquid medium. This requirement means that essentially no liquid containing dye or stain can penetrate the resist system to reach the plastic surface except at those points or lines where the resist system has been removed to give the identation 18 and the exposed plastic 20 of Fig. 3. If any appreciable quantity of the liquid medium is permitted to be absorbed or to penetrate the resist system, the result is a discoloration of the plastic surface surrounding the indicia. Of course, the more permeable the resist system is to the liquid medium used as the stain or dye carrier, the greater such a discoloration will be. Thus the resist system may be defined as a coating, the top surface of which is essentially unaffected by the liquid medium used as the stain or dye carrier.

In addition to being essentially resistant to the liquid medium carrying the dye or stain the resist system is preferably one which is easily removed by the use of a non-corrosive, cheap liquid such as water, a weak alkali (usually ammonium hydroxide), an alcohol, including ethyl, methyl and isopropyl, or an aromatic-based solvent such as naphtha.

The resist system may be applied by any process known in the art which is suitable for depositing thin coatings of a liquid solution or dispersion. Such processes include, but are not limited to, spraying, brushing, rolling, or dipping. If the resist is available in a fine gauge film (such as the copolymers of vinylidene chloride and acrylonitriles commonly sold as Saran), it may be heat sealed or laminated to the plastic base.

It will generally be preferable to keep the thickness of the resist to a minimum, i.e., of the order of 0.4 mil or less. Generally, if the resist system is made up of two coatings it is preferable that the thickness of the top coating is not more than about one-fourth the thickness of the first or bottom coating. Thus the thickness of the top coating may range from a monomolecular layer to about one-fourth the thickness of the bottom layer. Thicker resist systems, e.g., up to about 2 or 3 mils, may be used, particularly where they are easily removed. The scribing characteristics of the resist may also influence its thickness. For example if the width of the inscribed line is to be not less than 6 mils, the thickness of the first or bottom resist coating may be as much as 1 mil. In this case where a second resist layer is used it may be from about 0.1 to 0.3 mil thick.

The resist system may itself contain a dye or pigment to enhance the color contrast of the background for marking. If the resist system is made up of two coats, it will be preferable to include the pigment or dye in the first or bottom coat.

Typical first, or bottom, coats include but are not limited to such resins or resinous materials as the following:

Copolymer of vinyl acetate and an unsaturated carboxylic acid, e.g., crotonic acid,
Dichromated casein,
Dichromated alubumen,
Copolymer of polyvinyl methyl ether and maleic anhydride,
Polyvinyl pyrrolidone.

Typical second or top coatings may include but are not limited to such resins or plastics as the following:

Ammonium polyacrylate,
Vinylidene chloride-acrylonitrite copolymer,
Chlorinated rubber,
Phenolic resins,
Coumarone-indene resins.

Any of these listed as suitable for first or second resists may be used alone as the resist system. The materials suitable for resists may generally be defined as film formers, i.e., those materials which may be deposited in the form of a thin film from a solution or dispersion. The resulting film should be capable of temporarily adhering to a thermoplastic surface, and when dry be hard enough to withstand normal handling, including, if desired, light marking. The film is preferably also one which is essentially unaffected by normal changes in humidity and temperature. If the application of the finally marked surface is such that accuracy is important, the film, and hence resist material, should be one which does not change the dimensional characteristics of the thermoplastic base surface.

These resist materials are conveniently applied in alcohol or water solutions depending upon which is the better solvent and upon which is a non-solvent for the plastic surface. The resin content of the solution or dispersion from which these resist materials are deposited may vary widely, depending upon the coating technique. Preferably the resin content should not exceed about 40% by weight of the total weight of the solution or dispersion.

Once the resist system has been applied and dried to form a suitable surface for marking, the design or pattern of the indicia to be placed upon the plastic surface is sketched or drawn on the resist surface and sufficient displacement force or pressure is applied to remove or displace the resist and expose the plastic. Application of pressure may be accomplished by such means as a stylus, sharp knife edge and the like, depending upon the hardness of the resist system and upon the type of lines or marking required. For example, where a resist system is made up of a copolymer of vinyl acetate and crotonic acid as the first coating and ammonium polyacrylate as the second or top coating, the resist system is relatively hard and insensitive to a displacement force and requires a sharp knife-like edge to impress the pattern. This relative insensitivity to pressure means that the resist surface may be marked on by pencils or other devices to make a design before the necessary pressure is applied with a cutting tool to obtain the permanent mark. This also means that erasures and corrections may be made without adversely affecting the resist.

Another typical resist made up of a dichromated proteinaceous material such as gelatin, albumen or cassein, is more sensitive to displacement forces and the necesasry indentations may be made by means of a stylus or pen.

The dyes or stains used to mark the plastic surface may of course be of any desired color and should be either soluble or readily dispersible in the liquid medium used to carry them to the plastic surface. Such dyes or stains may include among others, Oracet red B, Oracet blue B, Orasol yellow 36, Luxol brilliant green BL, du Pont Spirit Black No. 3, and the like. Various colors and shades may also be obtained by mixing dyes and stains. The dye or stain should not of course be soluble in or react with the liquid used to remove the resist system to an extent that the tinctorial strength of the indicia on the surface is affected. The dye or stain, contained in the liquid medium carrier, is conveniently applied by any suitable technique such as brushing, swabbing, spraying, rolling, and the like.

As pointed out in the general description of this invention, it is necessary that the liquid medium which carries the dye or stain be one which is at least a partial solvent for or reactant with the plastic surface to be marked. Furthermore, it must be essentially a non-solvent for or a non-reactant with at least the top portion of the resist system. Typical liquid media include, but are not limited to, water; alcohol including the lower alcohols such as ethyl, methyl and isopropyl; aromatic such as benzene; and ketones such as methyl ethyl ketone and methyl isobutyl ketones. The choice of the liquid media will, of course, be made to correspond with the resist system and plastic surface used.

The removal of the resist system after the plastic surface has been stained is conveniently accomplished by dissolving the resist system in a suitable solvent, this solvent of course being a non-solvent for the plastic and a non-solvent for the stain or dye. Removal agents include weak aqueous solutions of an alkali such as ammonium hydroxide (from about 2 to about 28% $NH_3$ by weight), water, the lower alcohols including methyl, ethyl and isopropyl and aromatic-based solvents such as naphtha.

The indicia thus formed on the plastic surface are clear cut and clearly defined. It is possible in such a system to make extremely thin lines and to cross or intersect such thin lines with no thickening of the lines or feathering of the edges. It is also possible to make thin lines very closely together, the distance between them being no more than the thickness of the line.

Figure 6:
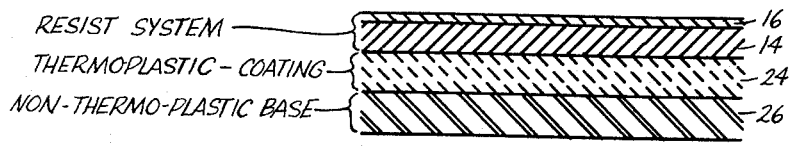
Fig. 6 is an enlarged cross-sectional representation of another modification of this invention showing a thermoplastic coating affixed to a non-thermoplastic base.

This invention also offers the possibility of marking thermoplastic coatings which have been deposited upon non-thermoplastic surfaces such as metals, glass, thermosetting resins, leather, wood, cellulosic materials, and the like. This is illustrated in Fig. 6 in which a thermoplastic coating 24 is put upon a non-thermoplastic surface 26. The thermoplastic coating surface may then be treated in the same way as the examples in Fig. 1 or Fig. 2 where a single resist 12 or a dual resist, made up of a bottom or first resist 14 and a second or top resist 16, is used. Indicia are formed on the plastic coating surface in the same manner as described above. The thickness of the plastic coating will preferably be such that the liquid medium carrying the dye or stain does not penetrate to a sufficient depth to remove the thermoplastic coating where the indicia are placed and reach the non-thermoplastic surface.

By marking thermoplastic coatings on a non-thermoplastic backing, it is possible to achieve marking on such non-thermoplastic backing without encountering the drawbacks inherent in the systems described above for marking such surfaces. For example, it is possible in effect to mark a metal surface quickly and inexpensively without the need for etching or depositing another metal thereon by a vacuum deposition technique. Glass surfaces may also be marked without the use of corrosive liquids or complicated apparatus and technique.

The following examples are given to illustrate this invention, but it is not intended that these examples be limiting. In each of these examples the plastic surface or plastic-covered surface was permanently marked with indicia, the lines of which were sharp, clean, and well-defined. The area surrounding the lines was free from any unwanted discoloration or cloudiness.

*Example I*

A 50-mil thick sample of polyvinyl chloride having a grained surface was first coated with a solution of a copolymer of vinyl acetate and crotonic acid (sold as Gelva C-3 V-10 by Shawinigan Resins Corp.). The solution was made up of 20 parts by weight copolymer dissolved in 80 parts by weight ethyl alcohol. It was coated by means of a roller coater on the vinyl surface at room temperatures to a thickness of about 1.5 to 2 mils, or equivalent to a dry thickness of about 0.4 mil. The coated surface was dried in an oven at a temperature between 100 and 110° F. After thorough drying, a second coating was deposited which consisted of 10 parts by weight of a 22% by weight solution of ammonium polyacrylate in 30 parts by weight of water and the pH adjusted to 8.2 with ammonium hydroxide. This solution was coated by means of a roller coater to give a very thin film (of the order of 0.1 mil) over the first resist coating. After drying in an air-circulating oven at approximately 110° F., the plastic surface containing the resist system was ready for marking. The final resist system was sufficiently pressure-insensitive that pencil marks could be made upon it and erased if necessary without exposing the plastic grained surface. Final marking was accomplished by means of a sharp point which cut through the resist system to expose the plastic surface. Staining was then accomplished with an ink formulation made up of a mixture of 5 grams of Oracet Red B, and 20 grams each of Oracet Blue B and Orasol Yellow 36 in a solvent consisting of 400 cc. toluene, 100 cc. methyl isobutyl ketone and 5 cc. castor oil. The resulting black ink was applied to the entire surface by means of a cotton swab and the resist was then removed by first dipping the plastic sample in a dilute solution of ammonium hydroxide (about 4%) and then wiping the surface with methyl alcohol.

The black lines thus formed on the grained plastic surface were thin, clear cut, and well-defined, and where they crossed, there was no thickening of the line or any visible feathering when examined at a magnification of 7x. The hardness of the resist and the excellent definition of the lines thus formed makes this combination of resist and vinyl surface particularly well suited for applications where very accurate marking is required.

*Example II*

Another sample of the same plastic material as in Example I was coated in the same manner except that titanium dioxide (about 3 to 4% by weight of resin content) was added to the first resist solution to give the final resist system a white opaque finish which enhanced the visibility of pencil lines made thereon. These pencil lines could be erased without harming the resist system.

*Example III*

A sample of a vinyl butyral plastic surface was coated in the manner described in Example I except that the first resist coat of the copolymer of vinyl acetate and crotonic acid was made up in a water solution rather than alcohol, and the ammonium polyacrylate was made up in an alcohol solution rather than a water solution. The two coatings were deposited in the same manner as in Example I and after the resist was marked, the ink of Example I was used to stain the exposed plastic. The resist system was removed by dipping the surface in a 15% ammonium hydroxide solution.

*Example IV*

A vinyl copolymer surface consisting of 15% polyvinyl acetate and 85% polyvinyl chloride was coated by means of a knife-coating apparatus with a dichromated albumen solution to give a final dry thickness of between 0.8 and 1 mil. This coating may be purchased as a prepared mixture (such as Positive Albumen Solution sold by Harold M. Pitman Co.) or may be made up by dissolving 18 parts by volume of egg albumen, 5 parts by volume of an ammonium dichromate solution (14° B.), 2.5 parts by volume of a dilute ammonia solution and 14 parts by volume of water.

The one coat of dichromated albumen made up the resist system of this example. After marking with a sharp tool to expose the vinyl surface, an ink prepared as in Example I was used to stain the vinyl surface. The resist system was removed by application of a 10% solution of ammonium hydroxide.

*Example V*

A sheet of cellulose acetate was coated with a copolymer of vinyl acetate and an unsaturated carboxylic acid (such as Gelva C-5 V-10 sold by Shawinigan Resins Corp.). The coating solution was made up of 20 parts by weight of the copolymer and 80 parts by weight of ethyl alcohol and was deposited by spraying to give a dry coating thickness of approximately 0.6 mil. After marking the surface with a sharply pointed instrument, the exposed plastic was stained with the ink of Example I. The resist system was removed with a 5% solution of sodium carbonate. A dilute solution of ammonia or either ethyl, methyl, or isopropyl alcohol may also be used for removing this resist system. The resulting indicia were sharply defined and very thin, unfeathered lines could be made.

*Example VI*

A sample of cellulose nitrate was coated and marked in the same manner as the cellulose acetate of Example V with equally good results.

*Example VII*

A sample of cellulose acetate butyrate was coated and marked in the same manner as the cellulose acetate sample of Example V with good results.

*Example VIII*

A sample piece of ethyl cellulose was coated with a 5% water solution of a copolymer of polyvinyl methyl ether and maleic anhydride. After the coating was dried at a temperature of about 110° F., it could be marked on with a stylus to expose the ethyl cellulose surface which was stained with the ink of Example I. The resist was removed with water.

*Example IX*

A sample sheet of polystyrene was first coated with an alcohol solution of a copolymer of vinyl acetate and crotonic acid to give a dry thickness of about 0.5 mil. Over this first resist coating was placed a thin film of the copolymer of vinylidene chloride (about 85% by weight) and acrylonitrile (about 15% by weight) plasticized with about 15% of dibutyl phthalate made up in a water solution to contain approximately 50% solids (sold as Saran F-122 A15, by the Dow Chemical Company). After this thin film was dried, the resist system was marked and an ink similar to that of Example I was applied to stain the exposed plastic areas. The resist system was removed with dilute ammonium hydroxide solution.

*Example X*

A sample sheet of methyl methacylate was coated with a solution of a coumarone-indene resin containing 20 parts by weight of the resin and 80 parts by weight of a high-flash naphtha. The resist system was dried and marked to expose the methyl methacrylate surface and ink for staining was prepared by dissolving Luxol brilliant green BL in methylene chloride in a 3% by weight solution. The resist system was removed with high-flash naphtha.

*Example XI*

A sample sheet of alcohol-soluble nylon was coated with a solution of sodium borophosphate (sold as Abapon by Glyco Products). After the resist system was marked by a sharp stylus, an ink prepared by dissolving crystal violet in methyl alcohol was used to stain the nylon surface. The resist system was then removed with water.

*Example XII*

A 15% solution of a mixture of vinyl polymers was first prepared by dissolving the mixture in 85 parts by weight of a 60–40 weight mixture of methyl isobutyl ketone and xylene. The vinyl polymer mixture was made up of 80% by weight of a copolymer of vinyl chloride (85% weight) and vinyl acetate (15% weight) and 20% by weight of a copolymer of vinyl chloride, vinyl acetate and maleic anhydride. The vinyl polymer solution was sprayed on a steel tape to a thickness equivalent to a final dry thickness of about 0.5 mil. Markings were made on this vinyl coating in the same manner as described for the vinyl plastic surface in Example I. The final vinyl coated, marked steel was suitable as a flexible measuring tape.

*Example XIII*

A glass surface was coated with a vinyl coating and marked in the same manner as the coated steel tape of Example XII.

*Example XIV*

A one-mil-thick film of Saran (copolymer of vinylidene chloride and acrylonitrile) was placed on the surface of a methyl methacrylate sheet and affixed thereto by passing the assembly through heated rollers. Incision of the Saran film to expose the methyl methacrylate surface was done with a sharp knife and the ink of Example X was brushed on. After the methyl methacrylate was stained, the Saran resist was removed with methyl ethyl ketone.

The above description of this invention and the examples cited show that a process is offered for permanently placing indicia upon a plastic surface by a simple inexpensive means. It is by this process possible to provide plastic surfaces with a resist coating which can be marked accurately without the necessity of going through complicated steps. It is also possible to provide plastic surfaces and plastic-coated surfaces with permanent indicia which exhibit excellent definition.

We claim:

1. Process for producing images on a thermoplastic surface, comprising the steps of applying a resist system to essentially completely cover said thermoplastic surface with a thin substantially continuous hard film, incising said resist system with a displacement force sufficient to expose said thermoplastic surface where said force is applied, applying an ink carried in a liquid medium which is at least a partial solvent for said thermoplastic surface thereby to stain the exposed portion of said surface in a desired pattern corresponding to said exposed portion, and removing said resist system to leave said pattern as a permanent image on said surface, at least the top portion of said resist system being essentially insoluble in and unreactive with said liquid medium carrying said ink.

2. Process in accordance with claim 1 wherein the step of applying said resist system comprises depositing a solution of said resist onto said surface and drying to remove the solvent of said solution.

3. Process in accordance with claim 1 wherein the step of applying said resist system comprises affixing a thin preformed film of said resist to said surface.

4. Process for producing images on a thermoplastic surface comprising the steps of applying a first resist essentially completely cover to said thermoplastic surface, applying a second resist to cover said first resist thereby to form a resist system covering said surface, incising said resist system with a displacement force sufficient to expose said thermoplastic surface where said force is applied, applying an ink carried in a liquid medium which is at least a partial solvent for said thermoplastic surface thereby to stain the exposed portions of said thermoplastic surface in a desired pattern corresponding to said exposed portion, and removing said resist system to leave said pattern as a permanent image on said thermoplastic surface, said second resist being essentially insoluble in and unreactive with said liquid medium carrying said ink.

5. Process in accordance with claim 4 wherein said second resist is a thin film having a thickness equivalent to about one-fourth the thickness of said first resist.

6. Process for marking a thermoplastic coated, non-thermoplastic surface, comprising the steps of applying a thermoplastic film to a non-thermoplastic surface, coating said thermoplastic film with a resist system to essentially completely cover said film, incising said resist system with a displacement force sufficient to expose said thermoplastic film where said force is applied, applying an ink carried in a liquid medium which is at least a partial solvent for said thermoplastic film thereby to stain the exposed portions of said thermoplastic film in a desired pattern corresponding to said exposed portion, and removing said resist system to leave said patterns as a permanent image on said thermoplastic film, at least the top portion of said resist system being essentially insoluble in and unreactive with said liquid medium carrying said ink.

7. Process in accordance with claim 6 wherein the step of applying said thermoplastic film comprises spraying a solution of said thermoplastic on said non-thermoplastic surface and drying said thermoplastic film to remove the solvent of said solution.

8. Process in accordance with claim 6 including the step of stopping the action of said liquid medium on said thermoplastic film before said liquid medium penetrates to the non-thermoplastic surface.

9. Process for marking a thermoplastic coated, non-thermoplastic surface with permanent indicia, comprising the steps of depositing a thermoplastic film on a non-thermoplastic surface, applying on said thermoplastic film a first resist to cover said film, applying a second resist to cover said first resist and form a resist system covering said thermoplastic film, incising said resist system with a displacement force sufficient to expose said thermoplastic film where said force is applied, applying an ink carried in a liquid medium which is at least a partial solvent for said thermoplastic film thereby to stain the exposed portion of said thermoplastic film in a desired pattern corresponding to said exposed portion, and removing said resist system to leave said pattern as a permanent image on said thermoplastic film, said second resist being essentially insoluble in and unreactive with said liquid medium carrying said ink.

10. A thermoplastic surface essentially completely covered with a resist system comprising a thin, substantially continuous hard film capable of being marked with pressure to remove said resist system and to expose said thermoplastic surface for subsequent staining with a dye carried in a liquid medium which is at least a partial solvent for said thermoplastic surface, at least the top portion of said resist system being essentially insoluble in and non-reactive with said liquid medium.

11. Plastic surface in accordance with claim 10 wherein said thermoplastic surface is grained polyvinyl chloride.

12. Plastic surface in accordance with claim 10 wherein said resist system consists essentially of a copolymer of vinyl acetate and crotonic acid as a first bottom resist and an ammonium polyacrylate as the second top resist.

13. A surface capable of being permanently marked, comprising a non-thermoplastic backing coated with a thermoplastic film having applied thereon a resist system comprising a thin, continuous, hard surface capable of being marked with pressure to remove said resist system and to expose said thermoplastic surface for subsequent staining with a dye carried in a liquid medium which is at least a partial solvent for said thermoplastic film, at least the top portion of said resist system being essentially insoluble in and non-reactive with said liquid medium.

14. Surface in accordance with claim 13 wherein said non-thermoplastic backing is metal.

15. Surface in accordance with claim 13 wherein said non-thermoplastic backing is glass.

16. Surface in accordance with claim 13 wherein said non-thermoplastic backing is a thermosetting resin.

References Cited in the file of this patent

UNITED STATES PATENTS

| | | |
|---|---|---|
| 2,103,587 | Lantz | Dec. 29, 1937 |
| 2,401,306 | Lavallee | June 4, 1946 |
| 2,602,025 | De Goeij et al. | July 1, 1952 |
| 2,666,008 | Enslein et al. | Jan. 12, 1954 |